United States Patent
Curtis et al.

(10) Patent No.: US 10,176,672 B2
(45) Date of Patent: *Jan. 8, 2019

(54) DYNAMICALLY PROVIDING REWARDS TO USERS IN A GAME SPACE

(71) Applicant: Electronic Arts Inc., Redwood City, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,233

(22) Filed: Jan. 25, 2017

(65) Prior Publication Data
US 2017/0132874 A1 May 11, 2017

Related U.S. Application Data

(63) Continuation of application No. 13/921,045, filed on Jun. 18, 2013, now Pat. No. 9,564,009.

(51) Int. Cl.
*A63F 9/24* (2006.01)
*A63F 13/00* (2014.01)
(Continued)

(52) U.S. Cl.
CPC .......... *G07F 17/3255* (2013.01); *A63F 13/00* (2013.01); *A63F 13/85* (2014.09); *G06Q 30/0207* (2013.01); *G09B 19/22* (2013.01)

(58) Field of Classification Search
CPC .. G07F 17/32; G07F 17/3225; G07F 17/3244; G07F 17/3255; G07F 17/326;
(Continued)

(56) References Cited

U.S. PATENT DOCUMENTS 9,564,009 B2 * 2/2017 Curtis ............... G06Q 30/0207
2002/0068622 A1 6/2002 Kelly
(Continued)

FOREIGN PATENT DOCUMENTS

| WO | 2002005172 | 1/2002 |
| WO | 2009002676 | 12/2008 |
| WO | 2014204926 | 2/2014 |

OTHER PUBLICATIONS

Orland, Kyle, 'Zynga 'PrivacyVille' Tutorial Rewards Users for Learning Data Storage Policy', Gamasutra News, Jul. 7, 2011, 2 pages.

(Continued)

*Primary Examiner* — Milap Shah
(74) *Attorney, Agent, or Firm* — Knobbe, Martens, Olson & Bear, LLP

(57) ABSTRACT

A system and method for providing rewards in a game space based on errors disrupting user interactions with the game space is disclosed. For providing such rewards, error information indicating the errors may be obtained and the errors may be extracted from the obtained error information. In some examples, levels of disruption caused by the errors may be determined. In some examples, support resources for addressing the errors may be determined. Rewards may be determined to be awarded to the users based on the determined levels of disruption and/or the determined support resources. In some examples, the determined rewards may be distributed to the users responsive to the users performing one or more actions addressing the errors on the client computing platforms associated with the users.

16 Claims, 5 Drawing Sheets

(51) Int. Cl.
  *G07F 17/00*  (2006.01)
  *G07F 19/00*  (2006.01)
  *G07F 17/32*  (2006.01)
  *G06Q 30/02*  (2012.01)
  *A63F 13/85*  (2014.01)
  *G09B 19/22*  (2006.01)

(58) Field of Classification Search
  CPC ............ G07F 17/3267; G06Q 30/0207; G06Q 30/0209
  See application file for complete search history.

(56) References Cited

U.S. PATENT DOCUMENTS

| | | |
|---|---|---|
| 2002/0142843 A1 | 10/2002 | Roelofs |
| 2007/0021198 A1 | 1/2007 | Muir |
| 2007/0099696 A1 | 5/2007 | Nguyen |
| 2008/0171593 A1 | 7/2008 | Haga |
| 2009/0275399 A1 | 11/2009 | Kelly |
| 2010/0030626 A1 | 2/2010 | Hughes |
| 2012/0040761 A1 | 2/2012 | Auterio |
| 2013/0273998 A1 | 10/2013 | Froy |
| 2014/0370968 A1 | 12/2014 | Curtis |
| 2015/0018072 A1 | 1/2015 | Palchetti |

OTHER PUBLICATIONS

PCT International Preliminary Report on Patentability for PCT/US2014/042679 dated Dec. 30, 2015 (7pgs).

\* cited by examiner

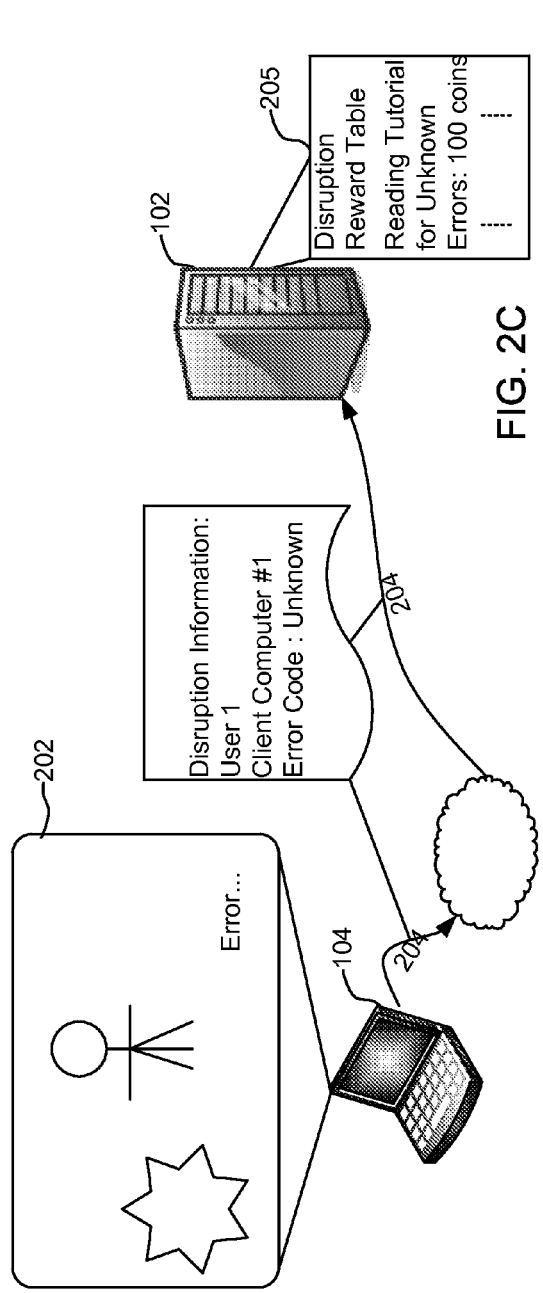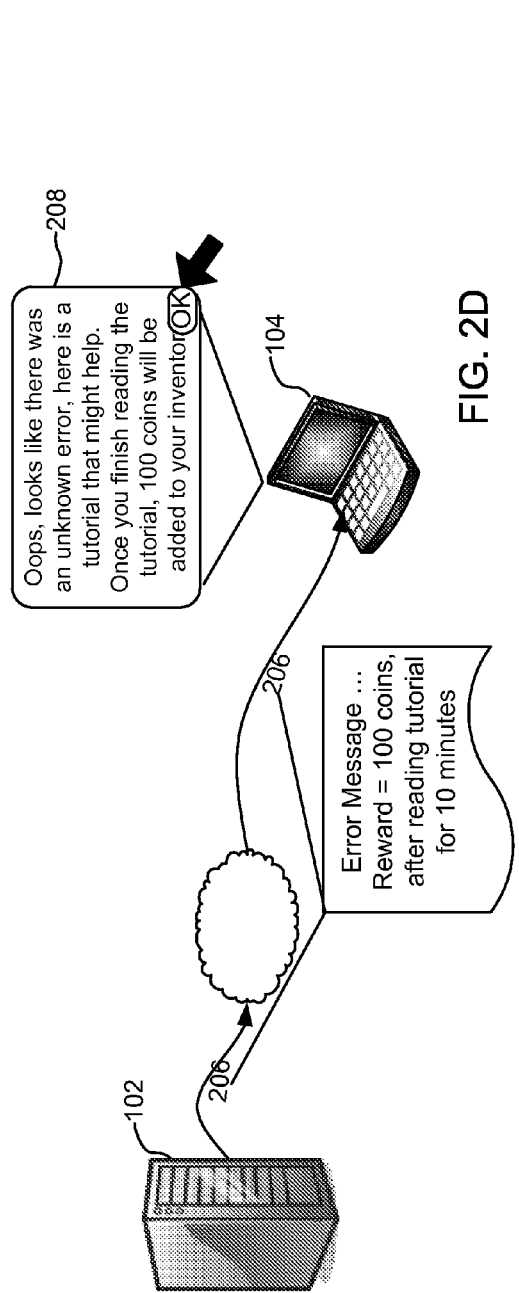

Back                    Tutorial

Common Issues: Basic Troubleshooting

The below troubleshooting steps will resolve the majority of game issues, including:

- Loading issues
- Lag
- Error messages
- Missing items
- Stuck progress
- Graphical glitches If you encounter these problems please try each solution one at a time, then test to see if your problem has been resolved. ⟋208

1. Refresh your Browser

- Most issues can be resolved by refreshing/ reload your browser

- Press F5 on your keyboard or click reload/refresh button

- Do a complete refresh of the page by pressing Ctrl+F5 on your keyboard

Done: 1 minute 5 seconds left

106

FIG. 2E

DYNAMICALLY PROVIDING REWARDS TO USERS IN A GAME SPACE

FIELD OF THE DISCLOSURE

This disclosure relates to providing rewards in a game space implemented on electronic devices, the rewards being provided to users of the game space for disruptions disrupting user interactions with the game space.

BACKGROUND

Game systems that provide access to shared, online game spaces are known. These systems typically enable users to access an online game through a client computing platform. The client computing platform executes a game or space client application that receives information from a game server, and uses the received information to present the game space to the user. For any of several reasons, interaction of the user with the game space through the client computing platform may be interrupted. These reasons may include, among other things, one or more of a bug in the client application, a discontinuity in operation at the server, a network issue, operator error, and/or other reasons.

SUMMARY

One aspect of the disclosure relates to providing rewards to game users for disruptions in user interactions with a game. For providing the rewards, information indicating such disruptions, such as, but not limited to, information indicating that the user is unable to launch a client game application, the client game application crashed, the user is unable to connect to a game server, the game space is displayed incorrectly on a client computing platform and/or other information indicating disruption disrupting user interactions with the game may be obtained. Rewards may be determined based on the disruptions indicated in the obtained information and distributed to the users for enhancing user relationships with the provider of the game. In some examples, support resources for addressing the errors may be determined and the rewards may be determined based on the determined support resources. This may enhance game experience of the users by providing positive effects to the users in light of the disruptions suffered by the users, and/or enhance game experience in other ways. This may help the provider of the game to improve user retention rate as the relationships between the users and the provider of the game may be enhanced by such rewards.

In some implementations, a system configured to provide rewards to users in a game may include a server. The server may be configured to execute one or more of a game space module, a disruption module, a support resource module, a reward module, a support interface module, a reward distribution module, a user action module, a user action verification module and/or other modules.

The game space module may be configured to implement an instance of a game space executed by the computer modules to determine state of the game space. The instance of the game space may comprise a simulated space that is accessible by users via clients (e.g., client computing platforms) that present the views of the game space to a user. The users may participate in the instance of the game space by controlling one or more of the available user controlled elements in the game space. Control may be exercised through control inputs and/or commands input by the users through client computing platforms. The users may interact with each other through communications exchanged within the game space. Prior to and/or during user interactions with the game space provided by the game space module, user interactions with the game space may be disrupted, e.g. by errors occurring on the client computers through which the users interact with the game space. Examples of causes of such disruption may include, but not limited to, game play problems, missing virtual item problems, virtual item not working problems, game loading problems, display problems, payment and/or billing issues, and/or other causes that may disrupt user interactions with the game space.

The disruption module may be configured to obtain information indicating disruption of user interactions with the game space. Such information may be stored by the server, by the client computing platforms associated with the users, network routers and/or gateways, and/or any other devices and/or components included in or coupled to the game system that provides the game. The disruption module may be configured to obtain such information, e.g., at a sampling rate predetermined by the provider, administrator, moderator, and/or any other entities related to the game space. Simultaneously or alternatively, the disruption module may be configured to obtain such information dynamically responsive to one or more disruption of the user interactions with the game space occurring within the system that provide the game space. In some implementations, the disruption module may be configured to determine levels of disruptiveness caused by the disruptions indicated in the obtained information. For such determinations, the disruption module may extract individual errors causing the disruptions from the obtained information and correspond the extracted errors to levels of disruptiveness as predetermined by the provider, administrator, moderator, and/or any other entities related to the game space. For extracting the errors indicated in the error information, in some exemplary implementations, the disruption module may be configured with error semantics to parse the obtained error information.

The support resource module may be configured to determine support resources for addressing the disruptions indicated in the error information obtained by the disruption module. In some exemplary implementations, the support resource module may determine the support resources based on the errors extracted by the disruption module. In some examples where specific errors may not be determined readily by the disruption module, for example, as they are not defined by the developer of the game space or in a format that may not be readily recognized by the disruption module (e.g., core dumps with binary code unreadable by a human), the support resource module may determine support resources, such as, but not limited to, general tutorial of the game space, list of answers to frequently asked questions (FAQs), and/or any other general support resources to address those errors.

The reward module may be configured to determine rewards based on the disruptions indicated in the information obtained by the disruption module. The rewards determined by the reward module may be awarded to the users for the disruption as experienced by the users on the client computing platforms, for encouraging users to take actions to resolve the disruptions, and/or for other reasons within the context of the game space. The rewards determined by the reward module may include rewards that can be redeemed and/or accessed within the game space provided by the game space servers and/or rewards that can be redeemed and/or accessed outside of the game space. In some examples, the rewards awarded may be determined by the reward module based on the levels of disruption determined by the disruption module. In some examples, the reward module may be configured to determine the rewards awarded to the users based on the support resources determined by the support resource module. For example, a user may be awarded rewards for reading a general tutorial of the game space as determined by the support resource module to address the errors.

The support interface module may be configured to effectuate presentation of the determined support resources in graphical support interfaces implemented on the client computer platforms associated with the users for facilitating the support resources determined by the support resource module. In some examples, the support interface module may be configured to effectuate presentation of notifications about the rewards determined by the reward module in the graphical support interfaces. Such notifications may be generated by the support interface module to include information regarding the rewards determined by the reward module and may be transmitted to the client computing platforms for presentation.

The reward distribution module may be configured to distribute the rewards determined by the reward module to the users in the game space. For such distribution, the reward distribution module may obtain information regarding profiles and inventories of the users who have been awarded rewards as determined by the reward module. In some exemplary implementations, the reward distribution module may be configured to distribute the rewards based on one or more actions being performed by the users to address the disruptions as determined by the user action module and/or the user action verification module.

The user action module may be configured to determine user actions on the client computing platforms for the users to address the disruption indicated in the information obtained by the disruption module. The determined user actions may include, but not limited to, reading the support resources determined by the support resource module, taking actions determined by the disruption module 108 to resolve the errors, providing more details about the errors, allowing the provider of the game space and/or any other entities to access the client computing platform 104, and/or any other user actions for addressing the errors. In some implementations, the determined user actions by the user action module may be facilitated by the graphical support interface on the client computing platform associated with the user.

The user action verification module may be configured to obtain information to verify execution of the user actions determined by the user action module on the client computing platforms. Information indicating, such as, game state changes, user interface actions, user database updates, and/or any other information indicating user actions within the game space may be obtained by the user action verification module for verifying the execution of the user action determined by the user action module on the client computing platforms.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2C illustrates another example of obtaining error information indicating an error disrupting a user's interaction with the game space.

FIG. 2D illustrates that the error illustrated in FIG. 2D may be addressed by the user by reading a tutorial guide and a corresponding reward may be awarded to the user for doing so.

FIG. 2E illustrates an example of presenting a tutorial on a client computing platform for addressing the error illustrated in FIG. 2C.

DETAILED DESCRIPTION

Figure 1:
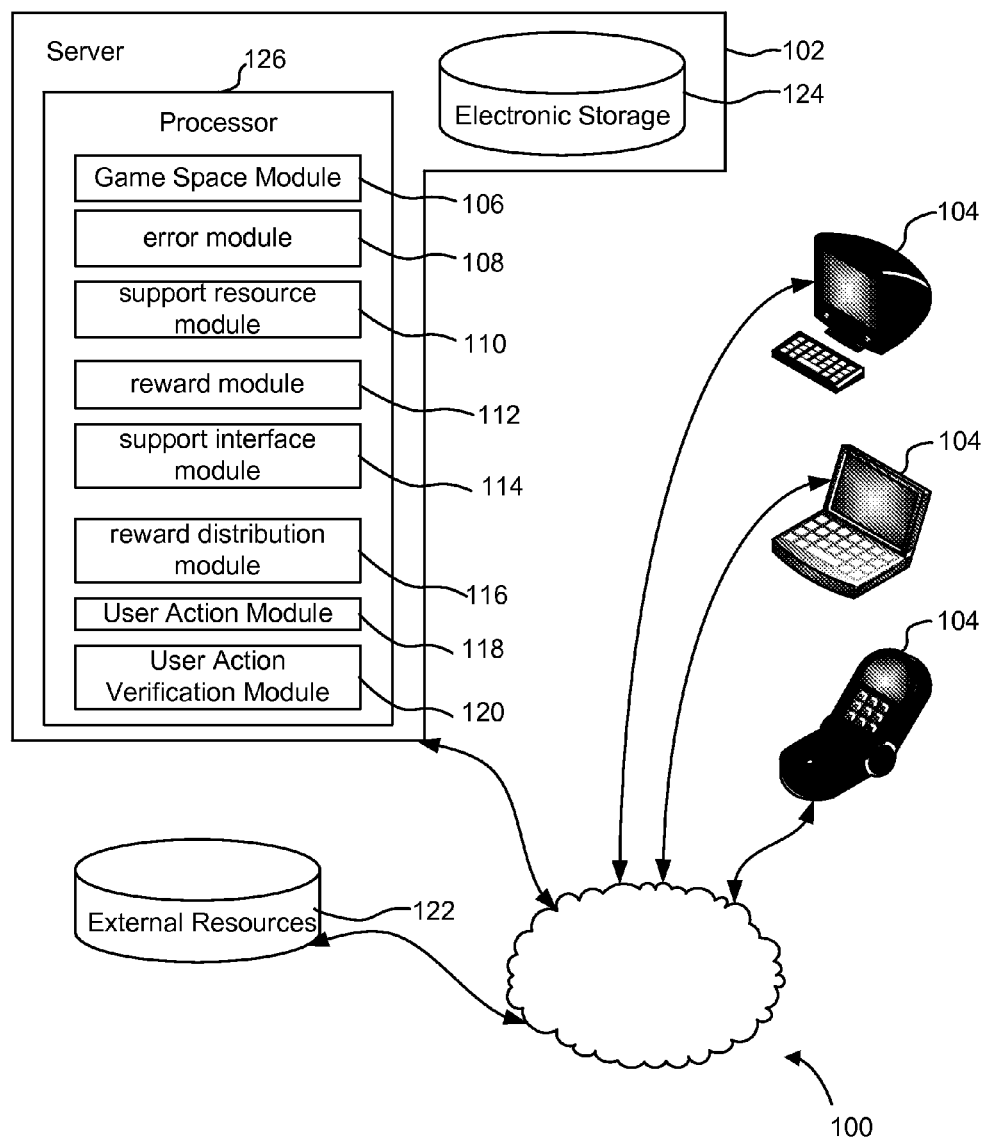
FIG. 1 illustrates one example of a system configured to provide rewards in a game space in accordance with the disclosure.

FIG. 1 illustrates a system 100 configured to provide rewards in a game space in accordance with one or more embodiments of the disclosure. Rewards may be provided to the users for errors disrupting user interaction with the game space. In some examples, support resources for addressing the errors may be presented to the users and rewards may be provided for users to use the support resources. This may improve relationships between the users and provider of the virtual space when the errors occur disrupting the users. Accordingly, this may enhance user retention rate for the provider of the game space.

Providing the game space may include hosting the game space over a network. In some implementations, system 100 may include a server 102. The users may access system 100 and/or the game space via client computing platforms 104. Server 102 may be configured to execute one or more computer program modules. The one or more computer program modules may include one or more of a game space module 106, disruption module 108, support resource module 110, reward module 112, support interface module 114, reward distribution module 116, a user action module 117, and/or any other modules.

The game space module 106 may be configured to implement the instance of the game space executed by the computer modules to determine state of the game space. The state may then be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the game space. The view described by the state for the given client computing platform 104 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the game space may comprise a simulated space that is accessible by users via clients (e.g., client computing platforms 104) that present the views of the game space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the game space is determined by game space module 106 is not intended to be limiting. The game space module 106 may be configured to express the game space in a more limited, or more rich, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance(s) of the game space executed by game space module 106, users may control characters, objects, simulated physical phenomena (e.g., wind, rain, earthquakes, and/or other phenomena), and/or other elements within the game space to interact with the game space and/or each other. The user characters may include avatars. As used herein, the term "user character" may refer to an object (or group of objects) present in the game space that represents an individual user. The user character may be controlled by the user with which it is associated. The user controlled element(s) may move through and interact with the game space (e.g., non-user characters in the game space, other objects in the game space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game space.

The users may participate in the instance of the game space by controlling one or more of the available user controlled elements in the game space. Control may be exercised through control inputs and/or commands input by the users through client computing platforms 104. The users may interact with each other through communications exchanged within the game space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game space module 106).

In some implementations, the user actions may be enabled to initiate the interactions by physical controls provided by the client computing platforms 104 through, such as but not limited to, play buttons, joysticks, motion sensors, cameras, keyboards, mouse, and/or any other control device provided by or coupled to client computing platforms 104. In some implementations, the actions may be enabled by controls provided by graphical user interface (GUI) implemented on client computing platforms 104, such as but not limited to, graphics, menus, dialog boxes, forms, sliding bars, buttons, radio box, tabs, and/or any other controls provided by the GUI. In any case, as so enabled, the user may provide inputs to direct game characters to perform game space maneuvers, to participate in virtual activities and/or engage in other interactions within the game space. For example, a user may provide an input specifying an amount of troops to be marched to a game space location to defend that game space location. Commands may be generated for the user action and may be executed by the game space module 106 in the game space such that the user interactions with the game space may be effectuated in the game space following the execution. Execution of such a command by the game space module 106 may produce changes to the game space state, which may reflect progresses and/or results of the user initiated actions. In some examples, state changes caused by user actions may be recorded in the electronic storage 122 to facilitate persistency throughout the instance of the game space.

Prior to and/or during user interactions with the game space provided by the game space module 106, the user interactions may be disrupted. Examples of causes of such disruption may include game play problems (e.g., virtual items vanished in the game space, unable to post on user's Facebook® walls, incorrect barbarian march raid time, a part of game screen is missing, and/or any other game play problems), missing virtual item problems (missing bonus items with the game space, reduced resource production, and/or any other missing virtual item problems), virtual item not working problems (e.g., unable to portal), game loading problems (e.g., part of game space and/or game plays fail to load), display problems (e.g., maps of game space are displayed incorrectly, incorrect resolutions), traffic errors, frozen screens, user character disappearance, payment and/or billing issues (e.g., authorization holds, how to use a coupon, how to pay with mobile phone, how to pay with credit card, and/or any other payment and/or billing issues), and/or any other causes that may disrupt user interactions with the game space.

In some examples, the causes that disrupt user interactions with the game space may persist on the server 102 and/or any other servers included in the game space and may be perceived by the users on the client computing platforms 104, e.g., server failures, inconsistency of the databases employed by the system 100, overload on the servers and/or the databases, and/or any other server errors. In some examples, such causes may persist on the client computing platform 104, e.g., component failures (such as hard drive, communication controller, memory and/or any other component failures), software corruption (e.g., corrupted game space client software programs, operating systems, file systems and/or any other software corruption), game space view implementation problems (e.g., graphics rendering issues, incorrect view zoom ratio, and/or any other game space view implementation problems), and/or any other client errors. In some examples, such causes may persist over the communication network(s) between the client computing platforms 104 and server 102, e.g., router issues, lost packets, communication timeouts, and/or any other network errors. In any case, these server, client and/or network errors may disrupt user interactions with the game space.

The disruption module 108 may be configured to obtain the information indicating disruption of user interaction with the game space, e.g., from the server 102, the client computing platforms 104 associated with the users, network routers and/or gateways, and/or any other devices and/or components included in or coupled to the system 100. For example, the server 102 may store information indicating server errors with timestamps in the electronic storage 122, e.g., error logs; the client computing platform 104 may store information indicating corrupted game client software—i.e., core dumps; and a network router may store information indicating communication errors between the client computing client platform 106 and the server 102. In any case, the disruption module 108 may be configured to obtain such information, e.g., at a sampling rate predetermined by the provider, administrator, moderator, and/or any other entities related to the game space. Simultaneously or alternatively, the disruption module 108 may be configured to obtain such information dynamically responsive to one or more errors disrupting the user interactions with the game space during runtime of the system 100.

In some implementations, the disruption module 108 may be configured to determine levels of disruptiveness caused by the disruptions indicated in the obtained information. For such determinations, the disruption module 108 may extract individual errors causing the disruption from the obtained information and correspond the extracted errors with levels of disruptiveness determined by provider, administrator, moderator, and/or any other entities related to the game space. For facilitating such determinations, a table specifying associations between levels of disruptiveness and the errors causing disruptions may be employed by the disruption module 108. For example, such a table may specify that errors preventing users from continuing to interact with the game space (e.g., show-stoppers) may be associated with level 5 (being highest) disruptiveness; may specify that errors related to game space purchases (e.g., incorrect number of virtual items purchased by a user is distributed to the user inventory) with level 4 disruptiveness; may specify that errors related to display problems with level 3 disruptiveness; may specify that errors related to game play problems with level 2 disruptiveness; may specify that errors related to in-game communication problems with level 1 disruptiveness; and so on.

For extracting the errors indicated in the obtained information, in some implementations, the disruption module 108 may be configured with error semantics to parse the obtained error information. Such error semantics may indicate, for example, specific error messages, error codes (e.g., errno), error classes, error content, error types, and/or any other semantics that define the errors disrupting user interactions in the game space. In some exemplary implementations, the semantics may include information indicating delimiters, network packet orders, data order, and/or any other information that may be employed by the disruption module 108 to parse the obtained information for extracting the errors. In any case, such error semantics may be used by the disruption module 108 at runtime of the system 100 to parse the obtained error information and extract one or more errors that are disrupting user interactions with the game space.

The support resource module 110 may be configured to determine support resources for addressing the disruption indicated in the information obtained by the disruption module 108. Examples of support resources may include, but not limited to, live chat operated by support agents associated with the game space, telephone support provided by the provider of the game space, email support through which the user may specify the customer support issue(s) he/she is experiencing, online game space guide (e.g., tutorial of the game space) explaining various operations and/or items of the game space, a list of articles explaining known problems, issues, bugs, fixes, features and/or any other knowledge related to the game space, a list of frequently asked questions by the users of the game space and corresponding answers, and/or any other support resources that may be provided to user to address the error(s) experience by the user.

In some exemplary implementations, the support resource module 110 may determine the support resources based on the errors causing the disruptions as extracted by the disruption module 108. For example, in some cases, error numbers (errno), error strings, error classes, and the like may be determined for the errors indicated in the error information and one or more support resources, such as messages explaining the errors, articles discussing options for resolving the errors, instructions for resolving the errors, and/or any other specific information for resolving the errors may be determined by the support resource module 110 as available support resources to resolve the errors. In some examples, specific errors may not be determined, for example, as they are not defined by the developer of the game space or in a format that may be readily recognized by the support resource module 110 (e.g., core dumps with human unreadable binary code), support resources such as, but not limited to, general tutorial of the game space, list of answers to frequently asked questions (FAQs), and/or any other general support resources may be determined by the support resource module 110 to address those errors.

The reward module 112 may be configured to determine rewards based on the disruptions indicated by the information obtained by the disruption module. The rewards determined by the reward module may be awarded to the users based on the disruption disrupting user interactions with the game space on the client computing platforms 104, for actions the users take to resolve the disruptions, for permitting the provider and/or any other entities to access the information indicating the disruption, for communicating the errors causing the disruption to other users in the virtual space, and/or for other reasons within the context of the system 100. Rewards awarded to a given user may be reflected within the user profile of the given user to provide the given user with access to the awarded rewards.

The rewards determined by the reward module 112 may include rewards that can be redeemed and/or accessed within the game space provided by the game space servers and/or rewards that can be redeemed and/or accessed outside of the game space. Rewards that can be redeemed and/or accessed within the game space may include, for example, virtual currency, virtual inventory items, services within the game space, and/or other rewards. Rewards that can be redeemed and/or accessed outside of the game space may include rewards that can be redeemed and/or accessed in the real world and/or within media other than the game space. By way of non-limiting example, such rewards may include real world goods and/or services, virtual currencies and/or goods associated with other interactive, electronic media, and/or other rewards.

In some examples, the rewards awarded may be determined by the reward module 112 based on the levels of disruptiveness caused by the disruptions as determined by the disruption module 110. To facilitate such determinations, provider, administrator, moderator, and/or any other entities related to the game space may define associations between levels of disruptiveness and corresponding rewards that may be awarded to the users. For example, it may be predetermined that for errors causing level 5 disruptiveness (being the highest), 100 coins may be awarded to the users experiencing such a level of disruptiveness; for errors causing level 4 disruptiveness, 75 coins may be awarded to the users experiencing such a level of disruptiveness; for errors causing level 3 disruptiveness, 50 coins may be awarded to the users experiencing such a level of disruptiveness; for errors causing level 2 disruptiveness, 25 coins may be awarded to the users experiencing such a level of disruptiveness; for errors causing level 1 disruptiveness, 5 coins may be awarded to the users experiencing such a level of disruptiveness; and so on.

In some examples, the reward module 112 may be configured to determine the rewards awarded to the users based on the support resources determined by the support resource module 110. For instance, in cases where no specific information provided to the users explaining the disruptions experienced by the users, 100 coins may be determined by the reward module 112 for the users to read a general tutorial of the game space; and in cases where specific information explaining the disruption (e.g., an error message), 50 coins may be awarded to the users as determined by the reward module 112.

The support interface module 114 may be configured to effectuate presentation of the determined resources in graphical support interfaces implemented on the client computer platforms associated with the users for facilitating the support resources determined by the support resource module 110. For such facilitations, the graphical support interfaces may be implemented on the client computing platforms 104 to cause electronic displays included in or coupled to the client computing platforms to present information about using support resources. For example, in a case where a game space tutorial is determined by the support resource module 110 to address the disruptions experienced by the users, the support interface module 114 may effectuate presentation of the tutorial in the graphical support interface and the user may read the tutorial to resolve the disruptions.

In some examples, the support interface module 114 may be configured to effectuate presentation of notifications about the rewards determined by the reward module 112 in the graphical support interfaces. Such notifications may be generated by the support interface module 114 to include information regarding the rewards determined by the reward module 112 and may be transmitted to the client computing platforms 104 for presentation in the graphical support interfaces implemented on the client computing platforms notify the users. For instance, in the case where the reward module 112 determines that 100 coins to be awarded to a user for an error disrupting the user interaction with the game space, the support interface module 114 may generate a notification notifying that the user that 100 coins has been delivered to the user inventory for the disruption caused by the error.

The reward distribution module 116 may be configured to distribute the rewards determined by the reward module 112 to the users in the game space. For such distribution, the reward distribution module 116 may obtain information regarding profiles and inventories of the users who have been awarded rewards as determined by the reward module 112. In some exemplary implementations, the rewards awarded may be simply added to the total of the user inventory in response to the rewards being determined by the reward module 112. In some other exemplary implementations, the reward distribution module 116 may be configured to distribute the rewards based on one or more actions being performed by the users to address the disruptions as determined by the user action module 118 and/or user action verification module 120.

The user action module 118 may be configured to determine user actions performed on the client computing platforms for the users to address the disruption indicated in the information obtained by the disruption module. The determined user actions may include, but not limited to, the user reading the support resources determined by the support resource module 110, electronically sending information regarding the errors, executing instructions determined by the disruption module 108 to resolve the disruptions, providing more details about the disruptions, allowing the provider of the game space and/or any other entities to access the client computing platform 104, communicating information regarding the errors causing the disruptions from the client computing platform to other game space users (e.g., by way of posting knowledge in a forum related to the game space) and/or any other user actions for addressing the errors on the client computing platforms 104. For example, the user action module 118 may determine that the user should restart the game client software implemented on the client computing platforms 104 to resolve a display problem indicated in the information obtained by the disruption module. In some implementations, the determined user actions may be facilitated by the graphical support interface on the client computing platform 104 to perform the actions determined by the user action module 118 to resolve the disruptions. For example, a button to "restart the game application" may be provided in the graphical support interface facilitating the user to restart the game application on the client computing platform 104.

The user action verification module 120 may be configured to obtain information to verify execution of the user actions determined by the user action module 118. Information indicating, such as, game state changes, user interface actions, user database updates, and/or any other information indicating user actions within the game space may be obtained by the user action verification module for verifying the execution of the user action determined by the user action module 118. For instance, for such verifications, the user action verification module 120 may be configured to interface with a game log module provided by the system 100 to obtain game logs recording user actions within the game space. In that instance, the user action verification module 120 may be configured to parse the obtained game logs for verifying the user's execution of the user actions determined by the user action module 118.

A given game space 102 server may include one or more processors configured to execute computer program modules which may execute and implement an instance of the game space for interaction. The game space server 102 may be connected with other components server through any suitable wired or wireless connections. Although in this example the game space 102 and system server 104 are illustrated as distinct components of the system 100, in some other examples, they may be combined in one server to provide integrated functionalities of the game space 102 and system server 104.

A given client computing platform 104 may include one or more processors configured to execute computer program modules. The computer program modules may be configured to enable an expert or user associated with the given client computing platform 104 to interface with server 102, external resources 122, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 122 may include internet service providers, telecommunication service providers, email service providers, sources of information, hosts and/or providers of virtual environments outside of system 100, external entities participating with system 100, and/or other resources. In some implementations, some or all of the functionality attributed herein to external resources 122 may be provided by resources included in system 100.

The server 102 may include electronic storage 124, one or more processors 126, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 124 may comprise electronic storage media that electronically stores information. The electronic storage media of electronic storage 124 may include one or both of system storage that is provided integrally (i.e., substantially non-removable) with server 102, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 124 may include one or more virtual storage resources (e.g., cloud storage, a virtual private network, and/or other virtual storage resources). Electronic storage 124 may store software algorithms, information determined by processor 126, information received from server 102, information received from client computing platforms 104, and/or other information that enables server 102 to function as described herein.

Processor(s) 126 is configured to provide information processing capabilities in system server 102. As such, processor 126 may include one or more of a digital processor, an analog processor, a digital circuit designed to process information, an analog circuit designed to process information, a state machine, and/or other mechanisms for electronically processing information. Although processor 126 is shown in FIG. 1 as a single entity, this is for illustrative purposes only. In some implementations, processor 126 may include a plurality of processing units. These processing units may be physically located within the same device, or processor 126 may represent processing functionality of a plurality of devices operating in coordination. The processor 126 may be configured to execute modules 110, 112, 114, 116, 118, 120. Processor 126 may be configured to execute modules 110, 112, 114, 116, 118, 120 by software; hardware; firmware; some combination of software, hardware, and/or firmware; and/or other mechanisms for configuring processing capabilities on processor 126.

It should be appreciated that although modules 110, 112, 114, 116, 118, 120 are illustrated in FIG. 1 as being co-located within a single processing unit, in implementations in which processor 108 includes multiple processing units, one or more of modules 110, 112, 114, 116, 118, 120 may be located remotely from the other modules. The description of the functionality provided by the different modules 106, 110, 112, 114, 116, 118, 120 described below is for illustrative purposes, and is not intended to be limiting, as any of modules 110, 112, 114, 116, 118, 120 may provide more or less functionality than is described. For example, one or more of modules 110, 112, 114, 116, 118, 120 may be eliminated, and some or all of its functionality may be provided by other ones of modules 110, 112, 114, 116, 118, 120. As another example, processor 108 may be configured to execute one or more additional modules that may perform some or all of the functionality attributed below to one of modules 110, 112, 114, 116, 118, 120.

Figure 2A:
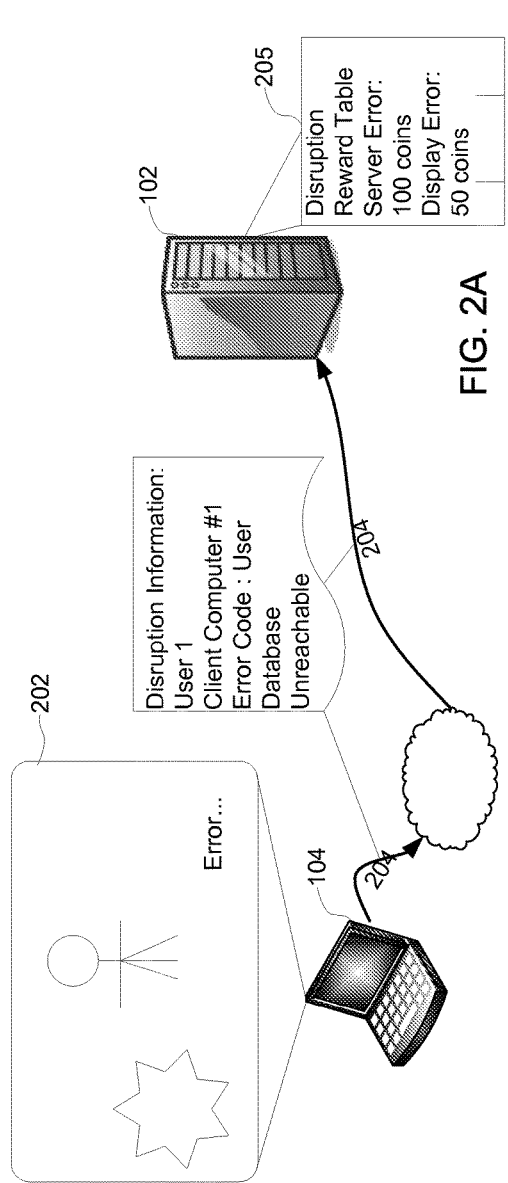
FIG. 2A illustrates an example of an error disrupting user interaction with a game space.

FIGS. 2A-E Illustrates various examples for providing rewards to users in a game space in accordance with one or more embodiments of the disclosure. They will be described with references to FIG. 1. FIG. 2A illustrates an example of a disruption disrupting user interaction with a game space. As shown in this example, the client computing platform 104 associated with a user, User 1 in this example, presents a view of the game space in a game interface 202. As illustrated, an error has occurred and is disrupting User 1's interaction with the game space. As shown, information 204 may be obtained by the server 102. The information 204 in this example indicates that User 1 is experiencing a disruption on client computing platform 104, and the disruption is due to unreachable user database employed by the provider of the game space. Also shown in this example is a disruption-reward table 205 predetermined by the provider of the game space. Based on the disruption-reward table 205, a reward for the disruption experienced by the User 1 may be determined by the server 102.

Figure 2B:
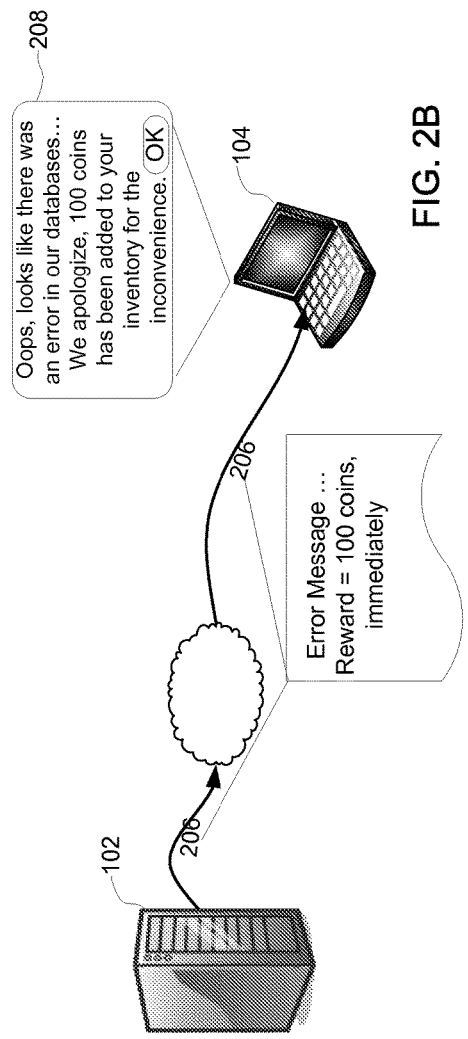
FIG. 2B illustrates an example of notifying about a reward determined for the error illustrated in FIG. 2A in a graphical support interface.

FIG. 2B illustrates an example of notifying about rewards determined for the disruption illustrated in FIG. 2A in a graphical support interface. As shown in this example, information 206 may be generated by the server 102 to indicate an error message explaining the disruption illustrated in FIG. 2A and a reward determined by the sever 102 according to the disruption-reward table 205 shown in FIG. 2A, e.g., via a reward module, that is to be distributed to User 1. As illustrated, the error message and reward may be presented in the graphical support interface 208, which in some implementations may make up at least a part of the game interface 202 shown in FIG. 2A.

FIG. 2C illustrates another example of obtaining information indicating a disruption disrupting a user's interaction with the game space. In this example, the error causing the disruption indicated in the information 204 is unknown. For addressing such a disruption caused by unknown errors, the server 102 may determine a general support resource such as a tutorial guide to be presented on the client computing platform 104 associated with User 1. As shown, the disruption-reward table 205 in this example may specify a reward for addressing such an unknown error. FIG. 2D illustrates that the server 102 generates information 206 indicating an error message explaining that the disruption illustrated in FIG. 2D may be addressed by the user by reading a tutorial guide. As shown, such an error message may be presented in the graphical support interface 208 implemented on the client computing platform 104. As also shown in this example, the server 102 may determine that a reward, i.e., 100 coins in this example, to be distributed to User 1 according to the disruption-reward table 205 illustrated in FIG. 2C.

FIG. 2E illustrates an example of presenting a tutorial on a client computing platform for addressing the disruption illustrated in FIG. 2C. As shown, such a tutorial may be presented in the graphical support interface 208. As illustrated, a timed button (i.e., a "done" button) indicating that the user has finished reading the tutorial may be provided in the graphical support interface 208 such that the button may be selected by the user only after 10 minutes elapsed from the time when the tutorial first being presented in the graphical support interface 208. In this example, the reward, i.e. the 100 coins, may be distributed to the user after the user selects the "done" button.

Figures 3, 4:
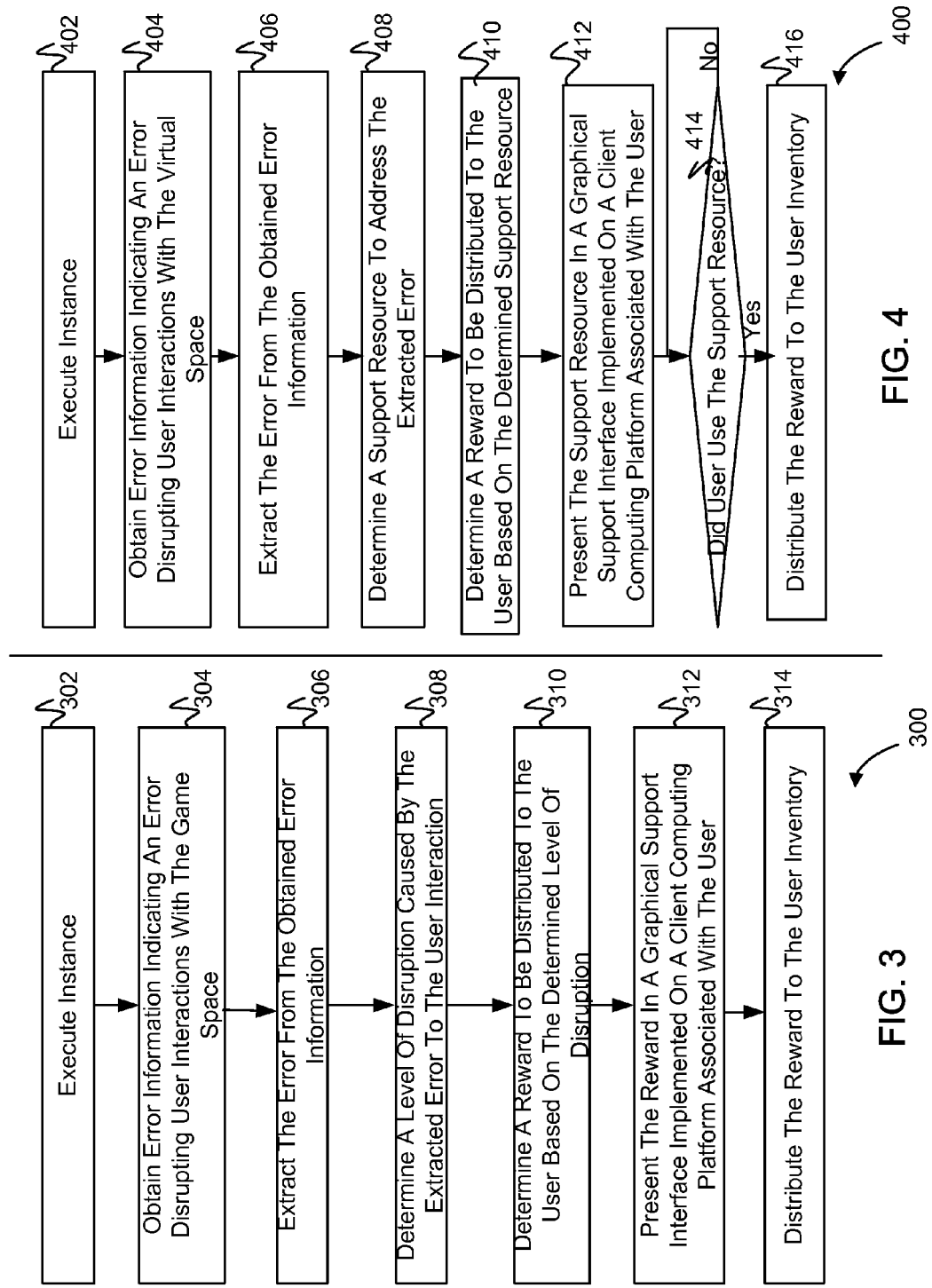
FIG. 3 illustrates an exemplary method for providing rewards in the game space in accordance with the disclosure.
FIG. 4 illustrates another exemplary method for providing rewards in the game space in accordance with the disclosure.

FIG. 3 illustrates an exemplary method 300 for providing rewards in the game space in accordance with the disclosure. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, an instance of a game space may be executed and implemented to determine view information for transmission to one or more client computing platforms associated with users. The users may participate in the game space by controlling entities therein. In some implementations, operation 302 may be performed by a game space module the same as or similar to game space module 106 (shown in FIG. 1 and described herein).

At operation 304, information indicating a disruption disrupting user interactions with the game space may be obtained. Such information may be stored by a game server, by client computing platforms 1 associated with the users, network routers and/or gateways, and/or any other devices and/or components. In some implementations, operation 304 may be performed by a disruption module the same as or similar to disruption module 108 (shown in FIG. 1 and described herein).

At operation 306, an error causing the disruption indicated in the information obtained in operation 304 may be obtained. For extracting the error, error semantics, for example, specific error messages, error codes (e.g., errno), error classes, error content, error types, and/or other semantics may be defined and employed. In some implementations, operation 306 may be performed by a disruption module the same as or similar to disruption module 108 (shown in FIG. 1 and described herein).

At operation 308, a level of the disruptiveness of the disruption may be determined. In some implementations, operation 308 may be performed by a disruption module the same as or similar to disruption module 108 (shown in FIG. 1 and described herein).

At operation 310, a reward to be distributed to the user may be determined based on the level of disruption determined in the operation 308. The determined rewards may include rewards that can be redeemed and/or accessed within the game space provided by the game space servers and/or rewards that can be redeemed and/or accessed outside of the game space. In some implementations, operation 310 may be performed by a reward module the same as or similar to reward module 112 (shown in FIG. 1 and described herein).

At operation 312, the reward determined in the operation 310 may be presented in a graphical support interface implemented on a client computing platform associated with the user. In some implementations, operation 312 may be performed by a support interface module the same as or similar to support interface module 114 (shown in FIG. 1 and described herein).

At operation 314, the reward determined in the operation 310 may be distributed to the user. In some implementations, operation 314 may be performed by a reward distribution module the same as or similar to reward distribution module 116 (shown in FIG. 1 and described herein).

FIG. 4 illustrates another exemplary method 400 for providing rewards in the game space in accordance with the disclosure. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, an instance of a game space may be executed and implemented to determine view information for transmission to one or more client computing platforms associated with users. The users may participate in the game space by controlling entities therein. In some implementations, operation 402 may be performed by a game space module the same as or similar to game space module 106 (shown in FIG. 1 and described herein).

At operation 404, error information indicating a disruption disrupting user interactions with the game space may be obtained. Such=information may be stored by a game server, by client computing platforms 1 associated with the users, network routers and/or gateways, and/or any other devices and/or components. In some implementations, operation 404 may be performed by a disruption module the same as or similar to disruption module 108 (shown in FIG. 1 and described herein).

At operation 406, an error causing the disruption indicated in the information obtained in operation 404 may be obtained. For extracting the error, error semantics, for example, specific error messages, error codes (e.g., errno), error classes, error content, error types, and/or other semantics may be defined and employed. In some implementations, operation 406 may be performed by a disruption module the same as or similar to disruption module 108 (shown in FIG. 1 and described herein).

At operation 408, a support resource to address the disruption may be determined based on the error extracted in operation 406. In some implementations, operation 408 may be performed by a disruption module the same as or similar to disruption module 108 (shown in FIG. 1 and described herein).

At operation 410, a reward to be distributed to the user may be determined based on the support resources determined in the operation 408. The determined rewards may include rewards that can be redeemed and/or accessed within the game space provided by the game space servers and/or rewards that can be redeemed and/or accessed outside of the game space. In some implementations, operation 410 may be performed by a reward module the same as or similar to reward module 112 (shown in FIG. 1 and described herein).

At operation 412, the reward determined in the operation 408 and the support resource determined in operation 410 may be presented in a graphical support interface implemented on a client computing platform associated with the user. In some implementations, operation 412 may be performed by a support interface module the same as or similar to support interface module 114 (shown in FIG. 1 and described herein).

At operation 414, a determination whether the user used the support resource determined in operation 408 is made. In some implementations, operation 414 may be performed by a user action verification module the same as or similar to a user action verification module 120 (shown in FIG. 1 and described herein). As shown, in the cases where it is determined that the user used the support resource on the client computing platform, the method proceeds to operation 416. In the cases where it is determined that the user has not used the support resource on the client computing platform, the method proceeds back operation 412.

At operation 416, the reward determined in the operation 410 may be distributed to the user. In some implementations, operation 416 may be performed by a reward distribution module the same as or similar to reward distribution module 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to dynamically provide rewards to users with-in a game space, the system comprising: one or more processors configured by machine-readable instructions to:

execute an instance of the game space, and to use the instance of the game space to effectuate presentation of views of the game space to users on client computing platforms to facilitate interaction of the users with the game space through the client computing platforms;

obtain information indicating disruptions of user interaction with the game space, wherein the disruptions include a first disruption and a second disruption that are each associated with a different one of a plurality of disruption types, wherein the plurality of disruption types include at least two or more of: a crash of a client computing platform, a gameplay error, a game loading error, an incorrect display of the game space, or a network communication error;

determine levels of disruptiveness caused by the disruptions indicated in the obtained information, the levels of disruptiveness including a first level of disruptiveness caused by the first disruption and a second level of disruptiveness caused by the second disruption, wherein the first level of disruptiveness is determined based at least in part on a first disruption type of the first disruption, wherein the second level of disruptiveness is different than the first level of disruptiveness and is determined based at least in part on a second disruption type of the second disruption;

determine rewards based on the disruptions indicated by the obtained information and the determined levels of disruptiveness such that responsive to obtaining information indicating that the first disruption disrupts interaction of the first user with the game space on a first client computing platform, a first reward to be distributed to the first user in the game space is determined based on the first level of disruptiveness caused by the first disruption to the first user on the first client computing platform, wherein the first reward is different compared to a second reward to be distributed to a second user that experienced the second disruption associated with the second level of disruptiveness;

obtain information indicating whether or not the disruptions have been resolved; and distribute, subsequent to the disruptions having been resolved, the rewards determined to the users in the game space.

2. The system of claim 1, wherein the one or more processors are configured by machine-readable instructions to:

determine support resources for addressing the disruptions such that responsive to obtaining the information indicating the first disruption, a first support resource is determined to address the first disruption; and effectuate presentation of the determined resources in graphical support interfaces implemented on the client computer platforms such that responsive to the first support resource being determined presentation of the first support resource is effectuated in a graphical support interface implemented on the first client computing platform.

3. The system of claim 2, wherein the one or more processors are configured by machine-readable instructions such that the determined first support resource includes at least one of a message, a game space guide, an article, or a list of answers to frequent asked questions (FAQ) to address the first disruption.

4. The system of claim 2, wherein the one or more processors are further configured by machine-readable instructions to determine the rewards based on the support resources determined to address the errors such that the first reward to be distributed to the first user is determined based on the first support resource.

5. The system of claim 2, wherein the one or more processors are further configured by machine-readable instructions to effectuate presentation of notifications about the rewards determined in the graphical support interfaces such that responsive to the first reward being determined presentation of a notification about the first reward is effectuated in the graphical support interface implemented on the first client computing platform.

6. The system of claim 2, wherein the one or more processors are configured by machine-readable instructions to:
determine user actions to address the disruptions indicated in the obtained information such that responsive to obtaining information indicating the first disruption, a first user action for the first user is determined to address the first disruption; and
effectuate presentation of information in the graphical support interface to facilitate users to execute the determined user actions on the client computing platforms associated with the users such that responsive to the first user action being determined presentation of information is effectuated in the graphical support interface implemented on the first client computing platform to facilitate the first user to execute the first user action on the first client computing platform.

7. The system of claim 6, wherein the one or more processors are configured by machine-readable instructions to:
obtain information to verify execution of the user actions determined such that responsive to the first user action being determined information is obtained to verify that the first user executed the first user action on the first client computing platform; and
distribute the first reward to the first user responsive to verifying that the first user executed the first user action on the first client computing platform.

8. The system of claim 7, wherein the one or more processors are configured by machine-readable instructions such that the determined first user action includes at least one of: the first user reading the first support resource determined on the computing platform associated with the first user, the first user electronically sending information regarding the first error from the first client computing platform to an entity associated with the game space, the first user electronically submitting information regarding the first error to a provider of the game space from the first client computing platform, or the first user communicating information regarding the first error from the first client computing platform to other game space users.

9. A computer-implemented method of dynamically providing rewards to users within a game space, the method being implemented by one or more physical processors configured by machine-readable instructions, the method comprising:
executing an instance of the game space, and using the instance of the game space to effectuate presentation of views of the game space to users on client computing platforms to facilitate interaction of the users with the game space through the client computing platforms;
obtaining information indicating disruptions of user interaction with the game space, wherein the disruptions include a first disruption and a second disruption that are each associated with a different one of a plurality of disruption types, wherein the plurality of disruption types include at least two or more of: a crash of a client computing platform, a gameplay error, a game loading error, an incorrect display of the game space, or a network communication error;
determining levels of disruptiveness caused by the disruptions indicated in the obtained information, the levels of disruptiveness including a first level of disruptiveness caused by the first disruption and a second level of disruptiveness caused by the second disruption, wherein the first level of disruptiveness is determined based at least in part on a first disruption type of the first disruption, wherein the second level of disruptiveness is different than the first level of disruptiveness and is determined based at least in part on a second disruption type of the second disruption;
determining rewards based on the disruption indicated in the obtained information and the determined levels of disruptiveness such that responsive to obtaining information indicating that the first disruption disrupts interaction of the first user with the game space on a first client computing platform, a first reward to be distributed to the first user in the game space is determined based on the first level of disruptiveness caused by the first disruption to the first user on the first client computing platform, wherein, the first reward is different compared to a second reward to be distributed to a second user that experienced the second disruption associated with the second level of disruptiveness;
obtaining information indicating whether or not the disruptions have been resolved; and
distributing, subsequent to the disruptions having been resolved, the determined rewards to the users in the game space.

10. The method of claim 9, further comprising:
determining support resources for addressing the disruptions such that responsive to obtaining the information indicating the first disruption, a first support resource is determined to address the first disruption; and
causing presentation of the determined support resources in graphical support interfaces implemented on the client computer platforms such that responsive to the first support resource being determined, presentation of the first support resource is provided in a graphical support interface implemented on the first client computing platform.

11. The method of claim 10, wherein the determined first support resource includes at least one of a message, a game space guide, an article, or a list of answers to frequent asked questions (FAQ) to address the first disruption.

12. The method of claim 10, further comprising determining the first reward to be distributed to the first user based on the first support resource.

13. The method of claim 10, further comprising effectuating presentation of notifications about the determined rewards in the graphical support interfaces such that responsive to the first reward being determined, effectuating presentation of a notification about the first reward in the graphical support interface implemented on the first client computing platform.

14. The method of claim 10, further comprising:

determining user actions to address the disruptions indicated in the obtained information such that responsive to obtaining error information indicating the first disruption, a first user action for the first user is determined to address the first disruption; and effectuating presentation of information in the graphical support interface to facilitate users to execute the determined user actions on the client computing platforms such that responsive to the first user action being determined, presentation of information is provided in the graphical support interface implemented on the first client computing platform to facilitate the first user to execute the first user action on the first client computing platform.

15. The method of claim 14, further comprising:

obtaining information to verify execution of the determined user actions such that responsive to the first user action being determined, information is obtained to verify that the first user executed the first user action on the first client computing platform; and distributing the first reward to the first user responsive to verifying that the first user executed the first user action on the first client computing platform.

16. The method of claim 15, wherein the determined first user action includes at least one of: the first user reading the first support resource on the first computing platform, the first user electronically sending information regarding the first error from the first client computing platform to an entity associated with the game space, the first user electronically submitting information regarding the first error to a provider of the game space from the first client computing platform, or the first user communicating information regarding the first error from the first client computing platform to other game space users.

* * * * *